United States Patent
Nam

(10) Patent No.: US 10,257,489 B2
(45) Date of Patent: Apr. 9, 2019

(54) STEREO CAMERA DEVICE AND RECTIFICATION METHOD THEREFOR

(71) Applicant: LG INNOTEK CO., LTD., Seoul (KR)

(72) Inventor: Dong Min Nam, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 245 days.

(21) Appl. No.: 15/109,062

(22) PCT Filed: Dec. 23, 2014

(86) PCT No.: PCT/KR2014/012675
§ 371 (c)(1),
(2) Date: Jun. 29, 2016

(87) PCT Pub. No.: WO2015/102280
PCT Pub. Date: Jul. 9, 2015

(65) Prior Publication Data
US 2016/0330427 A1   Nov. 10, 2016

(30) Foreign Application Priority Data
Dec. 30, 2013   (KR) ................. 10-2013-0167123

(51) Int. Cl.
*H04N 7/18* (2006.01)
*H04N 13/122* (2018.01)
(Continued)

(52) U.S. Cl.
CPC ............. *H04N 13/122* (2018.05); *B60R 1/00* (2013.01); *G06T 7/85* (2017.01); *H04N 13/106* (2018.05);
(Continued)

(58) Field of Classification Search
CPC .......... H04N 13/0007; H04N 13/0018; H04N 13/0022; H04N 13/106; H04N 13/122;
(Continued)

(56) References Cited

U.S. PATENT DOCUMENTS

2006/0221072 A1*  10/2006  Se ...................... G01C 11/06
                                                    345/420
2007/0211258 A1*  9/2007  Lee ...................... G01B 11/25
                                                    356/605
(Continued)

FOREIGN PATENT DOCUMENTS

JP         2012-7980 A       1/2012
KR    10-2011-0003611 A      1/2011
(Continued)

*Primary Examiner* — Farzana Hossain
(74) *Attorney, Agent, or Firm* — Birch, Stewart, Kolasch & Birch, LLP

(57) ABSTRACT

A stereo camera device according to one embodiment of the present invention comprises: a light pattern projection unit for projecting a predetermined pattern; a first camera unit for photographing the pattern; a second camera for photographing the pattern; and a control unit for controlling the light pattern projection of the light pattern projection unit, and determining whether to perform rectification between a first image and a second image by analyzing the first image photographed by the first camera unit and the second image photographed by the second camera unit.

6 Claims, 6 Drawing Sheets

(51) Int. Cl.
*H04N 13/128* (2018.01)
*H04N 13/254* (2018.01)
*H04N 13/271* (2018.01)
*B60R 1/00* (2006.01)
*G06T 7/80* (2017.01)
*H04N 13/246* (2018.01)
*H04N 13/296* (2018.01)
*H04N 13/106* (2018.01)

(52) U.S. Cl.
CPC ......... *H04N 13/128* (2018.05); *H04N 13/246* (2018.05); *H04N 13/254* (2018.05); *H04N 13/271* (2018.05); *H04N 13/296* (2018.05); *B60R 2300/105* (2013.01); *G06T 2200/04* (2013.01); *G06T 2207/10012* (2013.01); *G06T 2207/10028* (2013.01); *G06T 2207/30252* (2013.01); *H04N 2213/001* (2013.01)

(58) Field of Classification Search
CPC .. H04N 13/128; H04N 13/239; H04N 13/246; H04N 13/254; H04N 13/271; H04N 13/296; H04N 2213/001; H04N 13/0239; B60R 1/00; B60R 2300/105; G06T 2200/04; G06T 2207/10012; G06T 2207/10028; G06T 2207/30252; G06T 7/85
USPC .................................................. 348/47, 148
See application file for complete search history.

(56) References Cited

U.S. PATENT DOCUMENTS

2012/0105591 A1   5/2012   Kim et al.
2015/0049345 A1*  2/2015   Miyagawa ........... G01B 11/002
                                              356/625

FOREIGN PATENT DOCUMENTS

| KR | 10-2012-00069429 A | 6/2012 |
| KR | 10-2012-0102987 A  | 9/2012 |
| KR | 10-2013-0027671 A  | 3/2013 |

* cited by examiner

STEREO CAMERA DEVICE AND RECTIFICATION METHOD THEREFOR

TECHNICAL FIELD

The present invention relates to a stereo camera device and a rectification method therefor.

BACKGROUND ART

A stereo camera device is a device that simultaneously receives images from two cameras. The stereo camera device calculates distances from left and right images to an object, and thus may be used to obtain a three-dimensional (3D) image.

Such stereo cameras may be aligned on the same row, and may extract a depth of an object on the assumption that the stereo cameras are aligned on the same row. However, when a tolerance occurs in the production process or positions of the cameras deviate from each other during use, the stereo cameras may not be aligned on the same row. Specifically, it is easy for positions of stereo cameras mounted on a vehicle to be deviated from each other due to an impact and the like.

Thus, in order to obtain an accurate depth extraction result, a rectification process in which left and right images are changed to be like images photographed by two cameras aligned on the same row is required.

A reference point is required for rectification. Generally, the reference point may be extracted from a chess board or a 3D object. However, there are problems in that a space is required to install the chess board or the 3D object and the reference point is difficult to be recognized at night or in places such as a basement and the like, in which an amount of light is insufficient.

Therefore, a method of performing rectification without time and space constraints is required.

Disclosure

Technical Problem

The present invention is directed to providing a stereo camera device and a rectification method therefor.

Technical Solution

One aspect of the present invention provides a stereo camera device. The device includes a light pattern projection unit configured to project a predetermined pattern, a first camera configured to photograph the pattern, a second camera configured to photograph the pattern, and a controller configured to control a light pattern projection of the light pattern projection unit and determine whether to perform rectification between a first image and a second image by analyzing the first image photographed by the first camera and the second image photographed by the second camera.

The controller may drive a timer, and request the light pattern projection from the light pattern projection unit when the timer expires.

The controller may be connected to an electronic control unit (ECU) of a vehicle, and may request the light pattern projection from the light pattern projection unit after receiving an impact sensing signal from the ECU.

The device may further include a rectification unit configured to perform the rectification between the first image and the second image when receiving a rectification request from the controller.

The pattern may be an infrared (IR) pattern.

Another aspect of the present invention provides a rectification method for a stereo camera device. The method includes projecting a light pattern, photographing the projected pattern using a first camera, photographing the projected pattern using a second camera, analyzing a first image photographed by the first camera and a second image photographed by the second camera, and performing rectification when distortion occurs between the first image and the second image.

The light pattern may be projected when a preset timer expires.

The light pattern may be projected when an impact of the stereo camera device is sensed.

Advantageous Effects

According to embodiments of the present invention, rectification can be performed without time and space constraints. That is, there is no need to install or store a three-dimensional (3D) object in order to extract a reference point required for rectification, and rectification can also be performed at night or in a basement, in which an amount of light is insufficient. Further, since whether to perform the rectification is automatically determined before a user senses an abnormality and then the rectification is performed, the user does not need to directly visit a service center and the like, and the quality of an image can be improved.

MODES OF THE INVENTION

Figure 1:
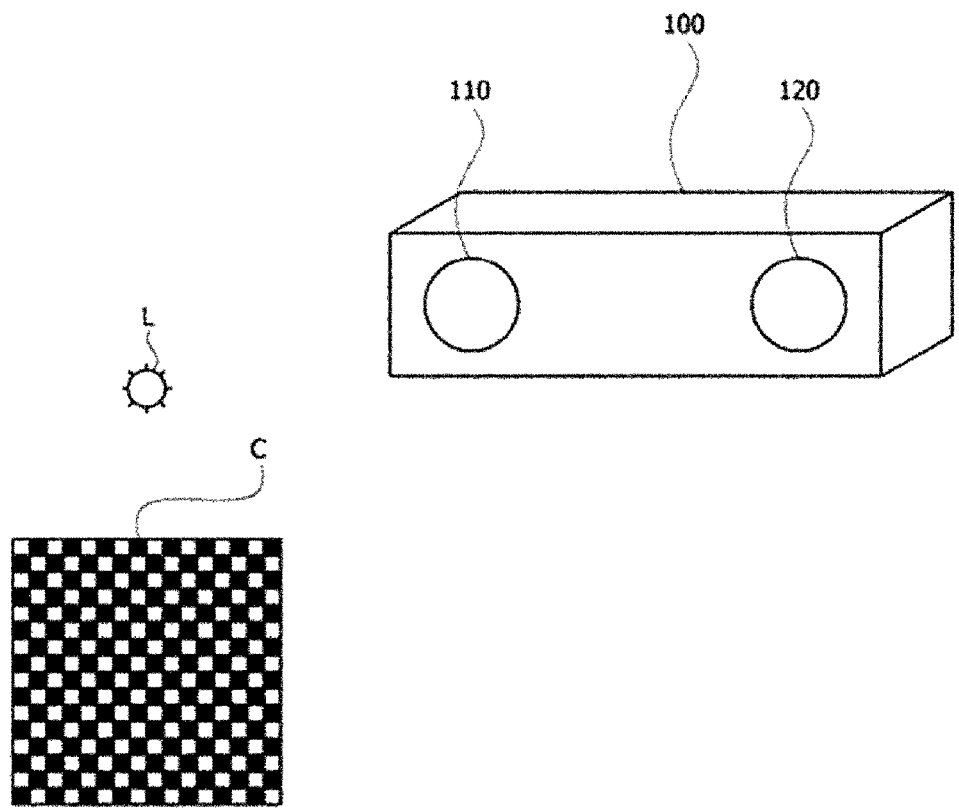
FIG. 1 is a view illustrating an example in which rectification is performed on a stereo camera device.

While the invention is may have various modifications and alternative forms, specific embodiments thereof are shown by way of example in the drawings and will be described herein in detail. It should be understood, however, that there is no intent to limit the invention to the particular forms disclosed, but on the contrary, the invention is to cover all modifications, equivalents, and alternatives falling within the spirit and scope of the invention.

It should be understood that, although the terms "first," "second," etc. may be used herein to describe various elements, these elements are not limited by these terms. These terms are only used to distinguish one element from another. For example, a first element could be termed a second element, and, similarly, a second element could be termed a first element without departing from the scope of the present invention. As used herein, the term "and/or" includes any and all combinations of one or more of the associated listed items.

It should be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting to the invention. As used herein, the singular forms "a," and "an" are intended to include the plural forms as well, unless the context clearly indicates otherwise. It should be further understood that the terms "comprise," "comprising," "include" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It should be further understood that terms, such as those defined in commonly used dictionaries, should be interpreted as having a meaning that is consistent with their meaning in the context of the relevant art and are not to be interpreted in an idealized or overly formal sense unless expressly so defined herein.

Hereinafter, exemplary embodiments of the invention will be described in detail with reference to the accompanying drawings. Like reference numerals denote like elements or corresponding elements even in different drawings, and thus the description thereof will not be repeated.

FIG. 1 is a view illustrating an example in which rectification is performed on a stereo camera device.

Referring to FIG. 1, a reference point is required to perform rectification on two cameras 110 and 120 of a stereo camera device 100. In order to extract the reference point, a chess board C or a three-dimensional (3D) object should be installed in front of the cameras 110 and 120. In this case, a space for installing the chess board C or the 3D object is required, and a light source L which irradiates the chess board C or the 3D object with light is required.

Thus, there is need to reduce space and time constraints for performing rectification in the stereo camera device.

According to the embodiment of the present invention, the stereo camera device includes a light pattern projection unit, and the light pattern projection unit projects a predetermined light pattern in order to extract the reference point for performing rectification.

Figure 2:
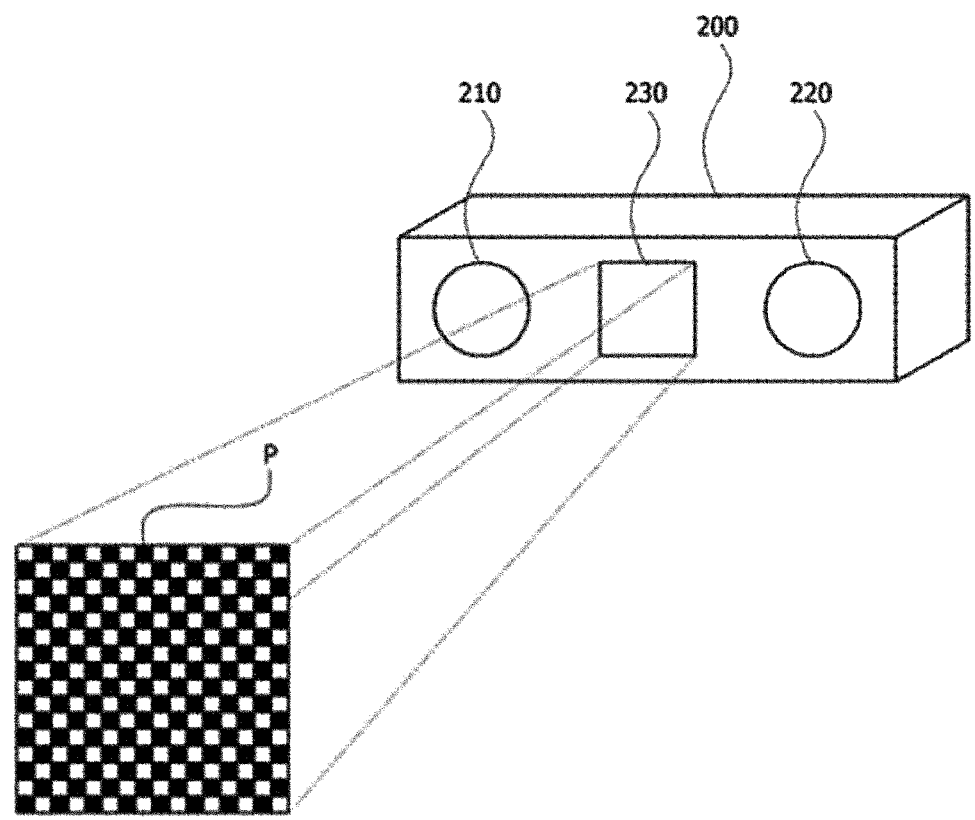
FIG. 2 is a view illustrating a stereo camera device according to one embodiment of the present invention and a pattern projected therefrom.

FIG. 2 is a view illustrating a stereo camera device according to one embodiment of the present invention and a pattern projected therefrom.

Referring to FIG. 2, a stereo camera device 200 includes two cameras 210 and 220 and a light pattern projection unit 230. The light pattern projection unit 230 projects a predetermined pattern P onto a screen or a wall. A reference point for rectification may be extracted from the pattern P projected by the light pattern projection unit 230. Accordingly, there is no need to install a chess board or a 3D object, and a separate light source is not required.

Hereinafter, the stereo camera device according to one embodiment of the present invention and a rectification method therefor will be described in detail.

Figure 3:
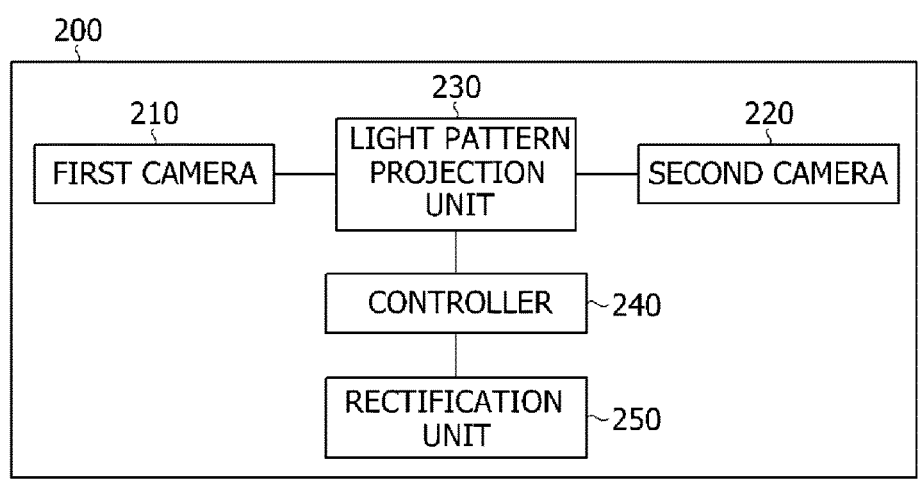
FIG. 3 is a block diagram illustrating the stereo camera device according to one embodiment of the present invention.
Figure 4:
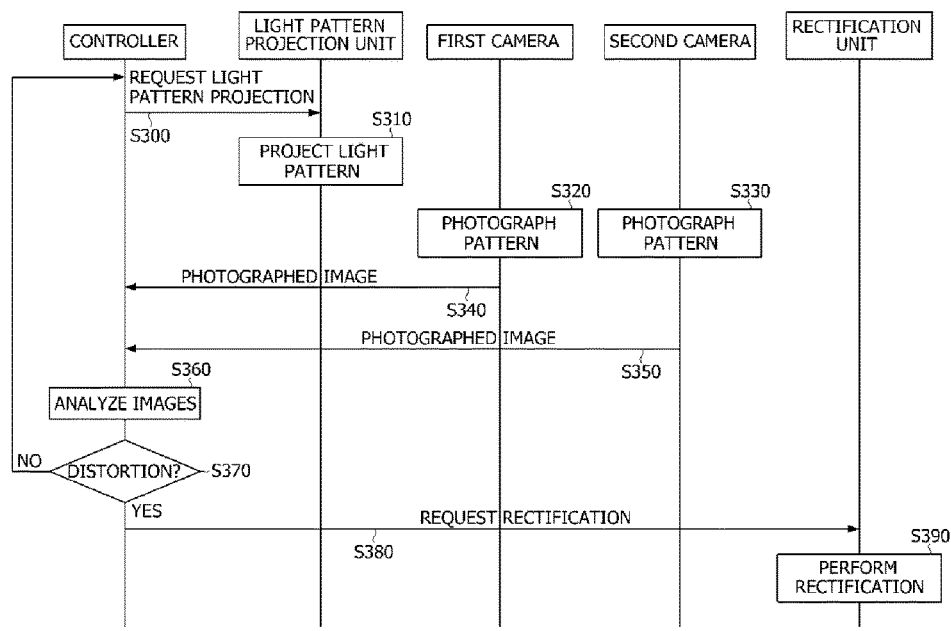
FIG. 4 is a flowchart illustrating a rectification method for the stereo camera device according to one embodiment of the present invention.

FIG. 3 is a block diagram illustrating the stereo camera device according to one embodiment of the present invention, and FIG. 4 is a flowchart illustrating a rectification method for the stereo camera device according to one embodiment of the present invention.

Referring to FIG. 3, the stereo camera device 200 includes a first camera 210, a second camera 220, the light pattern projection unit 230, a controller 240, and a rectification unit 250.

The first camera 210 and the second camera 220 may be aligned to be spaced a predetermined distance from each other on the same row. The first camera 210 and the second camera 220 photograph the same image from the left and right. Left and right images respectively photographed by the first camera 210 and the second camera 220 may be used to calculate a distance to an object. This method is similar to a principle in which a sense of perspective is felt due to parallax of binocular vision.

Meanwhile, the light pattern projection unit 230 is located between the first camera 210 and the second camera 220. The light pattern projection unit 230 may be aligned on the same row as the first camera 210 and the second camera 220. For example, the light pattern projection unit 230 may be disposed between the first camera 210 and the second camera 220, that is, on a center of a line that connects between the first camera 210 and the second camera 220. When the light pattern projection unit 230 projects a predetermined light pattern, each of the first camera 210 and the second camera 220 photographs the pattern projected by the light pattern projection unit 230. In this case, the pattern projected by the light pattern projection unit 230 may be, for example, a pattern having a chess board shape.

The controller 240 is connected to the first camera 210 and the second camera 220, and determines whether to perform rectification between a first image and a second image by analyzing the first image photographed by the first camera 210 and the second image photographed by the second camera 220. For example, when it is determined that a row alignment between the first camera 210 and the second camera 220 deviates from the first image and the second image, the controller 240 may transmit a rectification request to the rectification unit 250.

When the rectification unit 250 receives the rectification request from the controller 240, the rectification unit 250 performs rectification between the first image and the second image. That is, the rectification unit 250 changes the first image and the second image to be like images photographed by the first camera 210 and second camera 220 which are aligned on the row. For example, the rectification unit 250 may make an optical axis and principle points become parallel and cross at infinity. That is, the rectification unit 250 may perform the rectification so that conditions in which overlap between the first image and the second image is maximized and distortion is minimized are satisfied. The rectification unit 250 may perform rectification by using, for example, a Hartley algorithm or a Bouguet algorithm. In this case, a method of extracting a pattern of the light pattern projected by the light pattern projection unit 230 and a reference point in the pattern may vary according to the rectification method of the rectification unit 250.

Referring to FIGS. 3 and 4, when the controller 240 of the stereo camera device 200 requests light pattern projection from the light pattern projection unit 230 (S300), the light pattern projection unit 230 projects a predetermined light pattern (S310). In this case, the light pattern projection unit 230 may project the predetermined light pattern onto a screen or wall in front thereof. The light pattern may be infrared (IR) light, and a shape of the light pattern may be variously implemented according to a reference point extraction algorithm.

Each of the first camera 210 and the second camera 220 photographs the pattern projected by the light pattern projection unit 230 (S320 and S330), and transmits the photographed image to the controller 240 (S340 and S350). In this case, when each of the first camera 210 and the second camera 220 senses the projected light pattern, each of the first camera 210 and the second camera 220 may automatically photographs the pattern, and may be set to transmit the photographed image to the controller 240.

The controller 240 analyzes the images received from each of the first camera 210 and the second camera 220 (S360). To this end, the controller 240 extracts reference points from each of the images, and determines whether the images are distorted using the reference points.

When it is determined that the images are distorted (S370), the controller 240 requests rectification from the rectification unit 250 (S380), and the rectification unit 250 performs rectification (S390). That is, the rectification unit 250 may change two images to be like images photographed by cameras aligned on the same row. For example, the rectification unit 250 may make an optical axis and principle points become parallel and cross at infinity. Accordingly, overlap may be maximized and the distortion may be minimized. In this case, the rectification unit 250 may perform the rectification using epipolar geometry. In this manner, the rectification unit 250 may provide high-quality images by correcting errors of a device through software.

Meanwhile, in the stereo camera device according to the embodiment of the present invention, the controller 240 may automatically control the light pattern projection of the light pattern projection unit 230 for rectification.

Figure 5:
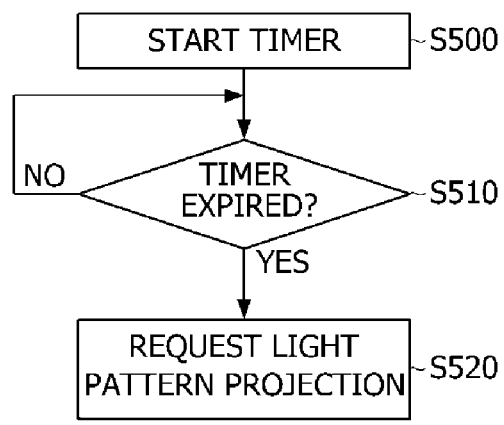
FIG. 5 is a flowchart illustrating a method of controlling a light pattern projection of the stereo camera device according to one embodiment of the present invention.

FIG. 5 is a flowchart illustrating a method of controlling a light pattern projection of the stereo camera device according to one embodiment of the present invention.

Referring to FIG. 5, the controller 240 of the stereo camera device starts a timer (S500). The timer may be preset by a user or may be preset according to specifications of the camera.

When the timer expires (S510), the controller 240 requests a light pattern projection from the light pattern projection unit 230 (S520).

In this manner, when a preset time has elapsed, the stereo camera device may automatically project a light pattern, and may perform rectification according to whether an image is distorted. Accordingly, the user's convenience may be improved, and the quality of depth extraction may be improved.

Although not illustrated, after the stereo camera device completes the rectification, the stereo camera device may start the timer again.

Figure 6:
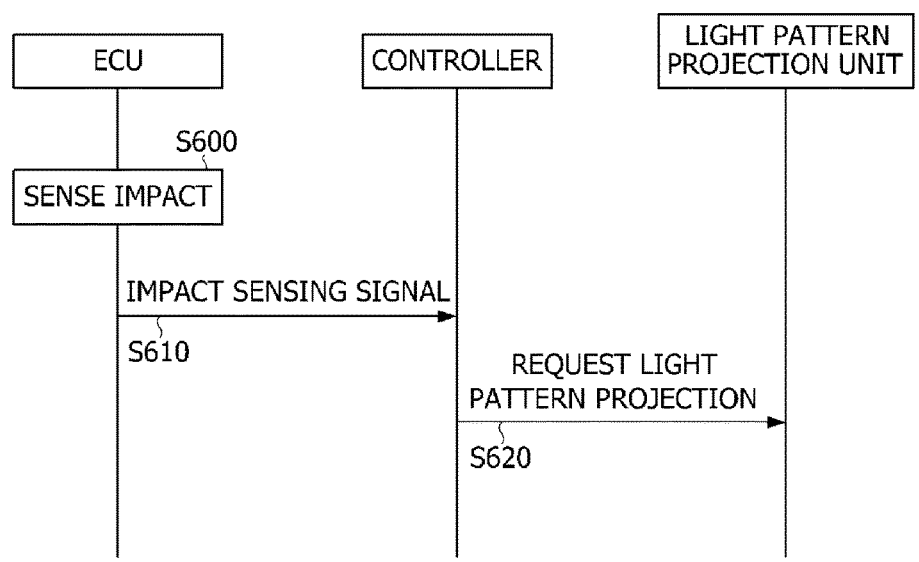
FIG. 6 is a flowchart illustrating a method of controlling a light pattern projection of a stereo camera device according to another embodiment of the present invention.

FIG. 6 is a flowchart illustrating a method of controlling a light pattern projection of a stereo camera device according to another embodiment of the present invention. It is assumed that a stereo camera device is mounted on an automobile.

Referring to FIG. 6, an electronic control unit (ECU) of the automobile senses an impact (S600). The ECU is connected to an acceleration sensor, a gyro sensor, an impact sensor, and the like and may sense an impact applied to the vehicle by these sensors.

When the ECU senses the impact, the ECU transmits an impact sensing signal to the controller 240 of the stereo camera device (S610).

When the controller 240 receives the impact sensing signal from the ECU, the controller 240 determines a possibility of positions of two cameras deviating from each other, and requests a light pattern projection from the light pattern projection unit 230 (S620). However, when the automobile is moving, the light pattern projection unit 230 may project the light pattern after the automobile stops. To this end, the ECU may transmit the impact sensing signal to the controller 240 after the automobile stops, or the controller 240 may request the light pattern projection from the light pattern projection unit 230 after the automobile stops.

In this manner, when the impact is applied to the vehicle, the light pattern may be automatically projected, and rectification may be performed according to the distortion of an image. Accordingly, since the rectification is automatically performed before the user senses an abnormality, the user's convenience can be improved.

While the example embodiments of the present invention and their advantages have been described above in detail, it will be understood by those of ordinary sill in the art that various changes, substitutions and alterations may be made herein without departing from the scope of the invention as defined by the following claims.

The invention claimed is:

1. A stereo camera device mounted on a vehicle, the stereo device comprising:
   a light pattern projector configured to project a predetermined light pattern in front thereof;
   a first camera configured to photograph the light pattern projected from the light pattern projector;
   a second camera configured to photograph the light pattern projected from the light pattern projector; and
   a controller configured to control a light pattern projection of the light pattern projector and determine whether to perform rectification between a first image and a second image by analyzing the first image photographed by the first camera and the second image photographed by the second camera,
   wherein the first camera and the second camera are aligned to be spaced a predetermined distance from each other on a same row,
   wherein the light pattern projector is located between the first camera and the second camera on the same row as the first camera and the second camera,
   wherein the controller requests the light pattern projection to the light pattern projector after receiving an impact sensing signal from an electronic control unit of the vehicle,
   wherein the light pattern projector projects the light pattern after the vehicle stops, and
   wherein the controller transmits a rectification request when a row alignment between the first camera and the second camera deviates from the first image and the second image.

2. The device of claim 1, wherein the controller extracts reference points from the first image and the second image, and determines whether to perform rectification using the extracted reference points.

3. The device of claim 1, further comprising a rectifier to perform the rectification between the first image and the second image when receiving the rectification request from the controller.

4. The device of claim 3, wherein the rectifier performs the rectification using epipolar geometry.

5. The device of claim 1, wherein the pattern is an infrared (IR) pattern.

6. A rectification method, which is a rectification method for a stereo camera device mounted on a vehicle, the method comprising:
- receiving an impact sensing signal from an electronic control unit of the vehicle;
- requesting a light pattern projection to a light pattern projector;
- projecting a light pattern using the light pattern projector in front thereof after the vehicle stops;
- photographing the projected light pattern using a first camera;
- photographing the projected light pattern using a second camera;
- analyzing a first image photographed by the first camera and a second image photographed by the second camera; and
- performing rectification when distortion occurs between the first image and the second image,
- wherein the first camera and the second camera are aligned to be spaced a predetermined distance from each other on a same row,
- wherein the light pattern projector is located between the first camera and the second camera on the same row as the first camera and the second camera, and
- wherein the rectification is performed when a row alignment between the first camera and the second camera deviates from the first image and the second image.

* * * * *